Dec. 31, 1968     A. C. SAMPIETRO     3,419,102
INDEPENDENT REAR SUSPENSION SYSTEM FOR A MOTOR VEHICLE
Filed March 1, 1967
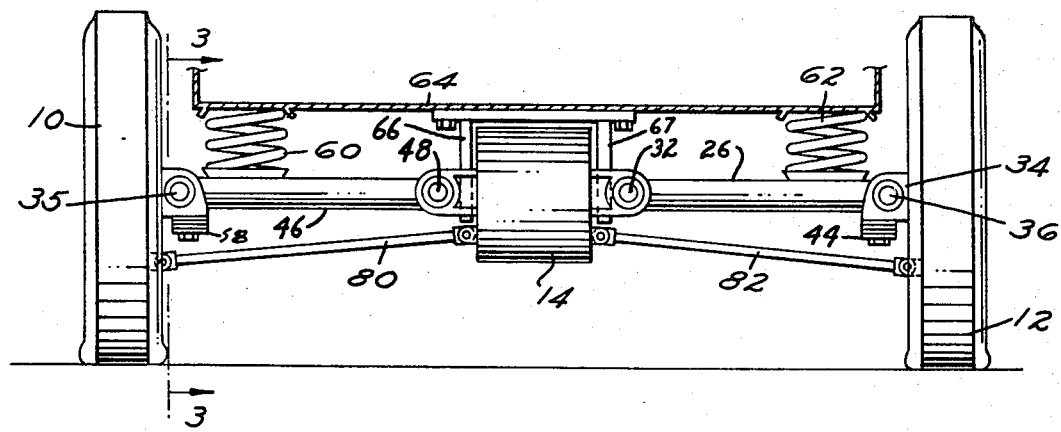
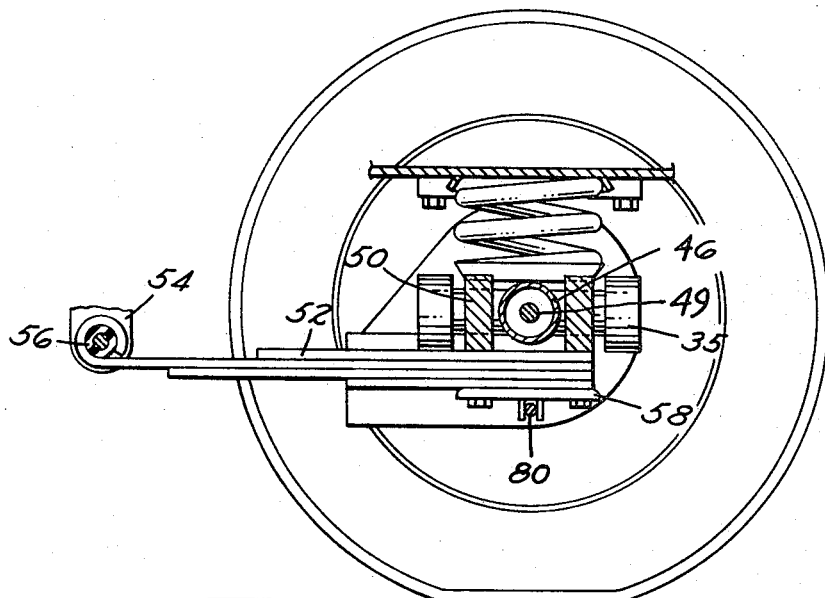
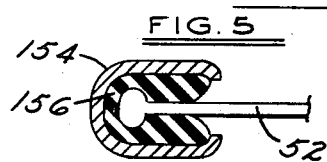
ACHILLE C. SAMPIETRO
INVENTOR
BY John R. Faulkner
Clifford L. Sadler
ATTORNEYS

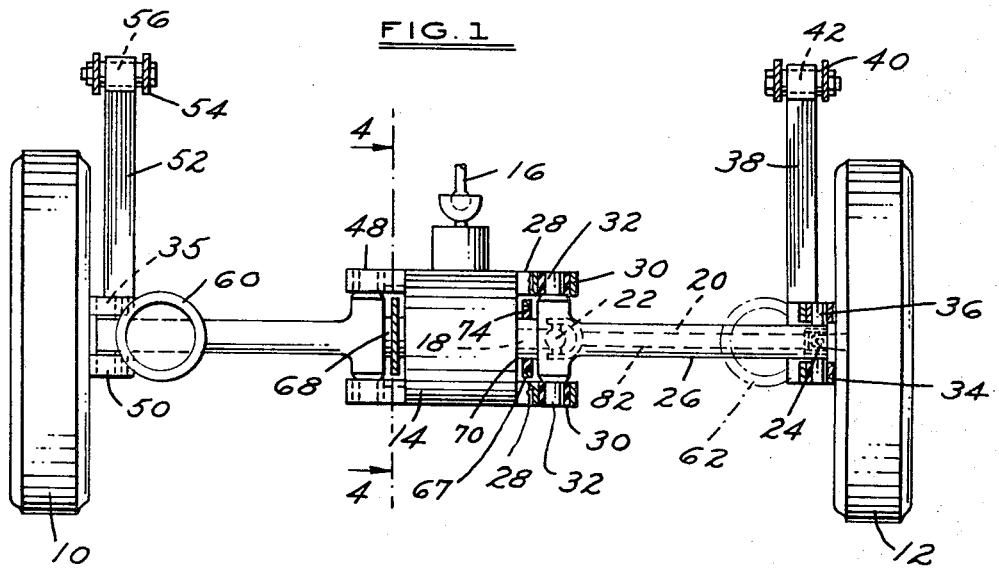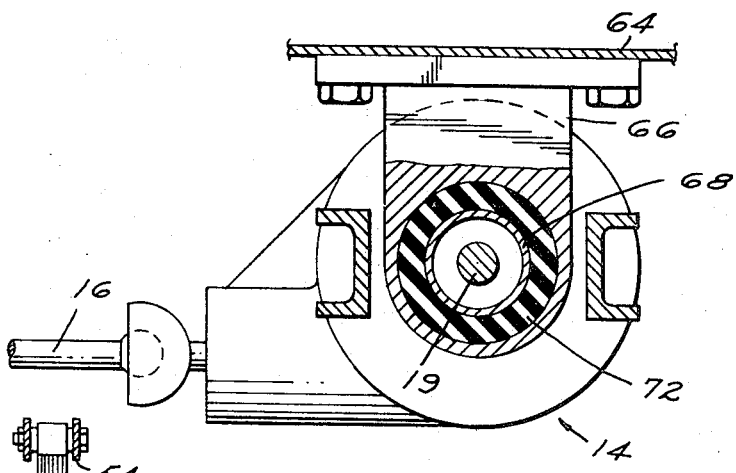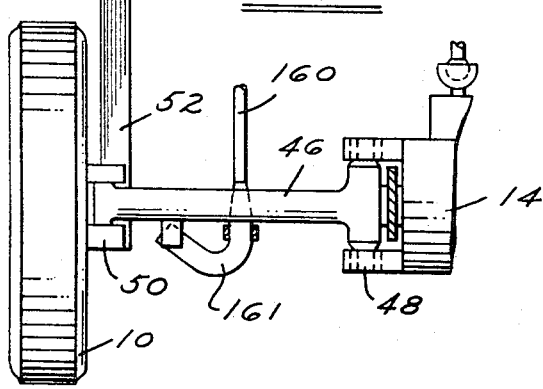

United States Patent Office 3,419,102
Patented Dec. 31, 1968

3,419,102
INDEPENDENT REAR SUSPENSION SYSTEM FOR A MOTOR VEHICLE
Achille C. Sampietro, Bloomfield Hills, Mich., assignor to Ford Motor Company, Dearborn, Mich., a corporation of Delaware
Filed Mar. 1, 1967, Ser. No. 619,734
9 Claims. (Cl. 180—73)

ABSTRACT OF THE DISCLOSURE

An independent rear suspension system for a motor vehicle in which the differential housing is supported on resilient members that permit limited rotation of the differential about a transverse axis. Rotation of the differential about that axis caused by driving torque is resisted by articulated links that surround the drive shaft and extend laterally to a connection with longitudinally extending trailing arms that are formed of leaf springs.

Background of the invention

The function and installation advantages of independent suspension system for the driving wheels of an automotive vehicle are well known. Unfortunately, with most known systems the effects of weight transfer during acceleration are not compensated, and while such effects may be negligible in a car with a poor power-to-weight ratio and stiff suspension, they make for unacceptable conditions when the vehicle has a good power-to-weight ratio and is softly sprung. The weight transfer incident to acceleration causes the rear end of the vehicle to "squat."

Many designers have tried to arrange the wheel locating linkage so that there is a vertical component to the driving force. Unfortunately, this entails a longitudinal component for the vertical motion of the wheel, thus bringing in suspension harshness in different directions.

This invention provides an anti-squat rear suspension system. The invention employs the torque reaction occurring during acceleration to support the weight transfer and to reduce the tendency for the rear of the vehicle to sag during acceleration.

Brief summary of the invention

In a suspension constructed in accordance with the preferred embodiment of this invention, the differential of a motor vehicle is suppored by resilient bushings spaced at its side adjacent to the output shaft. Articulated axle housing members support left and right axle shafts connected to the output members of the differential. The housings have their inner ends pivotally connected to the differential by devices providing longitudinal pivot axes. The outer ends of the housings are connected to the wheel bearing housing by means providing longitudinal pivot axes. Longitudinally extending leaf springs are rigidly connected to the wheel bearing housings adjacent to the outer end of the axle housings. The forward ends of the spring are pivotally joined to the vehicle frame.

During acceleration, torque reaction is transmitted from the differential through the axle housings to the spring in a direction tending to raise the vehicle body above the wheels. The torque reaction runs counted to the downward force resulting from weight transfer and thus reduces squatting.

Brief description of the drawings

FIGURE 1 is a top plan view of the rear suspension system for a motor vehicle incorporating the present invention;

FIGURE 2 is a rear elevational view of the suspension of FIGURE 1;

FIGURE 3 is a sectional view taken along section lines 3—3 of FIGURE 2;

FIGURE 4 is an enlarged view showing the mounting of the differential;

FIGURE 5 is a detailed view showing an alternate construction for connecting the leaf springs to the vehicle frame; and FIGURE 6 is an alternate construction of the suspension with a torsion bar spring replacing the coil spring of FIGURE 1.

Detailed description of the invention

Referring now to the drawings for a detailed understanding of the present invention, wherein like reference numerals identify like parts throughout the various views, FIGURE 1 discloses the rear suspension system for a motor vehicle incorporating the preferred embodiment of this invention. In FIGURE 1, a pair of driving wheels 10 and 12 are positioned laterally upwardly of a differential housing 14. The differential 14 receives driving torque from a rotating drive shaft 16 and delivers the driving torque through output shafts 18 and 19. The output shafts 18 and 19 rotate about a transverse axis.

Output shaft 18 is connected to an axle shaft 20 by means of a universal joint 22 positioned at its inner end. the outer end of the shaft 20 is connected through a universal joint 24 to the wheel 12. A similar articulated axle shaft is employed for connection of the left output shaft 19 of the differential 14 with the wheel 10. An articulated axle housing 26 surrounds the axle shaft 20 and has its inner end pivotally connected to bracket portions 28 of the differential 14 by means of bushings 30 and pivot portions 32. This structure provides a longitudinal pivot axis passing through the pivot pins 32 and intersecting the center of the universal joint 22.

Similarly, a pivot construction 36 connects the outer end of the axle housing 26 with the wheel bearing housing 34. The connection 36 has a longitudinal axis that passes through the center of the outer universal joint 24.

A resilient suspension link 38 is formed of spring leaves and has its forward end pivotally connected to a frame supported bracket 40 by means of a resilient bushing 42. The rear end of the leaf spring 38 is secured to the wheel bearing housing 34 by means of a spring clamp 44.

As seen in FIGURES 2 and 3, the left side of the suspension has a similar articulated axle housing 46 that is connected to the differential by means 48 providing a longitudinal pivot axis. The housing 46 encloses an axle shaft 49 connected to the left differential output 19. The outer end of the axle housing 46 is connected to the left wheel bearing housing 35 by means of a longitudinal pivot 50. As on the right side, a leaf spring link 52 has its front end pivotally connected to a frame bracket 54 by a bushing 56 and its rear end connected to the wheel bearing housing by a spring clamp 58.

Coil springs 60 and 62 for the left and right sides are interposed between the axle housings 26, 46 and vehicle chassis structure 64.

The differential 14 is supported on the chassis by left and right brackets 66 and 67. These brackets are bolted to the chassis support structure 64 and extend downwardly. Cylindrical housing portions 68 and 70 extend laterally from the sides of the differential 14 and are positioned about the output shafts 18 and 19. Annular rubber members 72 surround the cylindrical portions 68, 70 and are fitted within the left and right brackets 66, 67. The brackets 66 and 67 support the differential 14 against vertical and longitudinal forces. They provide limited support for torque reaction tending to rotate the differential about the axis of the output shafts 18 and 19. The resistance to rotation is provided by the axle housings 26 and 46 and their connection to the trailing spring links 38, 52.

The positioning of the wheels 10 and 12 is completed by left and right lower links 80 and 82. The inner ends of these links are pivotally connected to the differential 14 and the outer ends of the links 80 and 82 are pivotally connected to the wheel bearing housings 34, 35.

FIGURE 5 discloses an alternate construction of the connection between the forward end of the leaf spring link 52 and the frame. In this construction, the conventional military eye bushing is not used. The rubber piece 156 is folded over the enlarged end 157 of the spring leaf 152. The rubber 156 and spring end 157 are fitted within the bracket 154 to form a sandwich-like arrangement. This construction has greater longitudinal resiliency or compliance properties than the structure of FIGURE 3.

FIGURE 6 is of interest because of its showing of an alternate spring support. In this construction, a torsion bar 160 having a hook-shaped end 161 is shown as engaging the left axle housing 46. The torsion spring 160 is a substitute for the coil spring 60 of FIGURE 2. It functions in a similar fashion.

Operation

Referring to FIGURE 3, the driving torque of shaft 49 is counterclockwise and the reaction is clockwise. This reaction is transmitted through the axle housing 26 to the leaf spring link 52. It exerts a downward force on the wheel 10 through the connection with the wheel bearing housing 35. An upward force is also exerted through the bracket 54 against the vehicle. This upward force counteracts the effect of the weight transfer insofar as vehicle "squatting" resulting from acceleration is concerned. The springs 38, 52 contribute little to the load carrying performance. The vehicle load is carried by the coil springs 60 and 62, however, because the differential and axle housings are torsionally rigid, the springs 38, 52 will furnish an anti-roll effect.

The foregoing description presents the presently preferred embodiment of this invention. Modifications and alterations may occur to those skilled in the art that will come within the scope and spirit of the following claims.

I claim:

1. An independent suspension system for a motor vehicle having a support structure, a differential gear unit supported on said structure by means permitting limited rotation about a transverse axis, driving wheels positioned laterally of said differential, drive shafts interconnecting said differential and said driving wheels, wheel support members rotatably supporting said wheels, torque reaction members interconnecting said differential and said wheel support members, positioning means connected to said support structure, and said wheel supporting members, first pivot means having longitudinal pivot axes interconnecting the inner ends of said torque reaction members and said differential, second pivot means having longitudinal pivot axes interconnecting said wheel members and said torque reaction members.

2. The independent suspension system of claim 1 and including:
said positioning means comprising members having their forward ends pivotally connected to said support structure and their rear ends connected to said wheel support members.

3. The independent suspension system of claim 1 and including:
said positioning means comprising leaf spring members having their forward ends pivotally connected to said support structure and their rear ends rigidly connected to said wheel support members.

4. The independent suspension system of claim 1 and including:
main suspension springs interposed between said torque reaction members and said support structure, said torque reaction members comprising tubular axle housings encircling said drive shafts.

5. The independent suspension system of claim 1 and including:
said positioning means comprising members having their forward ends pivotally connected to said support structure and their rear ends connected to said wheel support members, laterally extending link means having their inner ends pivotally connected to said differential and their outer ends pivotally connected to said wheel support members.

6. The independent suspension system of claim 1 and including:
first universal joints connecting said drive shafts to said differential, second universal joints connecting said drive shafts to said driving wheels, the pivot axes of said first pivot means intersecting the centers of said first universal joints, the pivot axes of said second pivot means intersecting the centers of said second universal joints.

7. The independent suspension system of claim 1 and including:
said positioning means comprising members having their forward ends pivotally connected to said support structure and their rear ends connected to said wheel support member, main suspension springs interposed between said torque reaction members and said support structure, said torque reaction members comprising tubular axle housings encircling said drive shafts, laterally extending link means having their inner ends pivotally connected to said differential and their outer ends pivotally connected to said wheel support members.

8. The independent suspension system of claim 1 and including:
first universal joints connecting said drive shafts to said differential, and second universal joints connecting said drive shafts to said driving wheels, main suspension springs interposed between said torque reaction members and said support structure, the pivot axes of said first pivot means intersecting the centers of said first universal joints, the pivot axes of said second pivot means intersecting the centers of said second universal joints, said torque reaction members comprising tubular axle housings encircling said drive shafts, laterally extending link means having their inner ends pivotally connected to said differential and their outer ends pivotally connected to said wheel support members.

9. The independent suspension system of claim 1 and including:
first universal joints connecting said drive shafts to said differential, second universal joints connecting said drive shafts to said driving wheels, said positioning means comprising leaf spring members having their forward ends pivotally connected to said support structure and their rear ends connected to said wheel support members, main suspension springs interposed between said torque reaction members and said support structure, the pivot axes of said first pivot means intersecting the centers of said first universal joints, the pivot axes of said second pivot means intersecting the centers of said second universal joints, said torque reaction members comprising tubular axle housings encircling said drive shafts, laterally extending link means having their inner ends pivotally connected to said differential and their outer ends pivotally connected to said wheel support members.

References Cited

UNITED STATES PATENTS 3,202,235   8/1965   Warner _____ 180—73

A. HARRY LEVY, *Primary Examiner.*